A. HANTSCH.
STAND FOR BICYCLES.
APPLICATION FILED JAN. 3, 1920.

1,344,226.

Patented June 22, 1920.

Arthur Hantsch
Inventor

By his Attorney
Ivan E. A. Konigsberg

UNITED STATES PATENT OFFICE.

ARTHUR HANTSCH, OF LINDEN, NEW JERSEY.

STAND FOR BICYCLES.

1,344,226.

Specification of Letters Patent.   Patented June 22, 1920.

Application filed January 3, 1920. Serial No. 349,144.

*To all whom it may concern:*

Be it known that I, ARTHUR HANTSCH, a citizen of Germany, residing at Linden, Union county, New Jersey, have invented certain new and useful Improvements in Stands for Bicycles, of which the following is a specification.

This invention relates to improvements in stands for bicycles. The object of the invention is to provide a stand arranged to support a bicycle a short distance above the ground, so that the bicycle may be conveniently cleaned, inspected and repaired. Also for the purpose of taking the weight off the tires.

Accordingly my invention is embodied in a stand as hereinafter described and as illustrated in the accompanying drawing in which—

Figure 1:
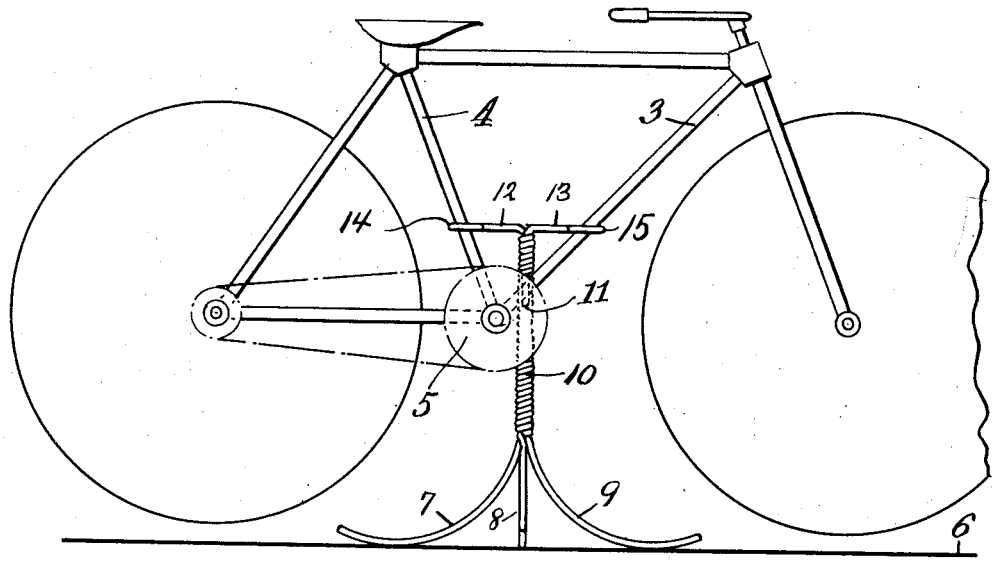
Figure 1 is a view of a bicycle supported on the stand.

Referring to Fig. 1, the bicycle is shown in outline only and for the purposes of this disclosure and the proper understanding of my invention, the reference numeral 3 denotes the front frame member and 4 is the middle frame member. 5 is the gear for the driving chain. The other well known elements of the machine need not be referred to except to call attention to the fact that the bicycle is entirely raised from the ground indicated at 6.

Figure 2:
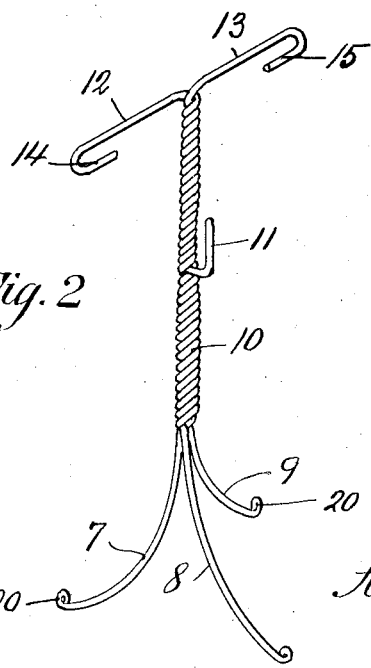
Fig. 2 is a perspective view of the stand embodying my invention.

The stand comprises foot members 7, 8 and 9, suitably joined to form a standard 10 from which projects a lower hook member or bracket 11 and two upper hook members or arms 12 and 13 having hooks 14 and 15. In the particular embodiment shown, the stand is made of three lengths of heavy wire, twisted as shown in Fig. 2, where it will be seen that two of the wires are of equal lengths to form the feet 7 and 9 and the arms 12 and 13, while the third wire is shorter and forms the foot 8 and the hook 11. The hooks may be covered, if desired, to prevent scratching the bicycle frame.

In use, the bicycle is lifted in over and placed in the stand as shown in Fig. 1 so that the two frame members 3 and 4 rest in the hooks 15 and 14 respectively and the frame member 3 also rests in the hook 11 so that the bicycle is prevented from turning in the stand. The hook 11 catches the frame between the latter and the gear as shown.

It will be noted that the stand is on the left side of the bicycle. In the event the stand is made larger, it may be on either side thereof. It will also be noted that the stand will accommodate any make of bicycle as the latter may be tilted slightly depending on the angle between the members 3 and 4.

The foot members may be of any form. In Fig. 2, the ends 20 thereof are shown looped, while in Fig. 1 they are plain. Neither is it of importance that the stand should be made of wire. It may be made up of other material in any other manner within the requirements outlined above.

I claim:

A bicycle stand comprising three members twisted together and bent to form foot members below the twisted portions, one of said members projecting from the twisted portions and bent to form an upright hook, the other two members being bent in opposite directions above the twisted portions, the free ends of said two members being bent back upon the members to form two laterally disposed opposed hooks.

In testimony whereof I have signed this specification this 3rd day of December, 1919.

ARTHUR HANTSCH.